(12) United States Patent
Johnson

(10) Patent No.: US 7,213,821 B1
(45) Date of Patent: May 8, 2007

(54) EXPANDABLE CART APPARATUS

(76) Inventor: Roy F. Johnson, 3410 De Reimer Ave., Apartment 4C, Bronx, NY (US) 10475

( * ) Notice: Subject to any disclaimer, the term of this patent is extended or adjusted under 35 U.S.C. 154(b) by 165 days.

(21) Appl. No.: 11/022,746

(22) Filed: Dec. 28, 2004

(51) Int. Cl.
*B62B 1/12* (2006.01)

(52) U.S. Cl. .............................. 280/79.2; 280/33.998; 280/3.991; 280/33.997; 280/47.34; 280/129

(58) Field of Classification Search ............... 280/79.2, 280/33.998, 3.991, 33.997, 47.34, 129; 248/129
See application file for complete search history.

(56) References Cited

U.S. PATENT DOCUMENTS

| | | | |
|---|---|---|---|
| 2,958,536 A | | 11/1960 | Young |
| 3,787,063 A | | 1/1974 | Oliver |
| 4,281,813 A | * | 8/1981 | Garrity ........................ 248/97 |
| 4,441,734 A | * | 4/1984 | Schlissel ..................... 280/638 |
| 5,740,939 A | * | 4/1998 | Muldner et al. ....... 220/495.11 |
| 6,179,150 B1 | * | 1/2001 | Fogler ........................ 220/489 |
| D445,230 S | | 7/2001 | Deal et al. |
| 6,641,147 B2 | | 11/2003 | Werner |
| 2003/0011152 A1 | | 1/2003 | Teeten |
| 2003/0042694 A1 | | 3/2003 | Werner |
| 2003/0197339 A1 | | 10/2003 | D'Angelo |

* cited by examiner

*Primary Examiner*—Christopher P. Ellis
*Assistant Examiner*—Cynthia F. Collado

(57) ABSTRACT

An expandable cart apparatus includes a cart that has a bottom wall, a front wall, a back wall, a first side wall and a second side wall. The cart includes four vertically orientated corners each defining a post with an open upper end. A plurality of wheels is rotatably coupled to the bottom wall. A loop has a generally rectangular shape and includes a pair of lateral portions and a pair of end portions. Each of a plurality of secondary walls is attached to and extends downwardly from one of the lateral and end portions. Each of a plurality of rods is attached to the loop and extends downwardly therefrom. Each of the rods is extended into one of the upper ends of the posts. The rods are selectively positionable with respect to the posts so that each of the secondary walls is positioned outside of the cart.

6 Claims, 4 Drawing Sheets

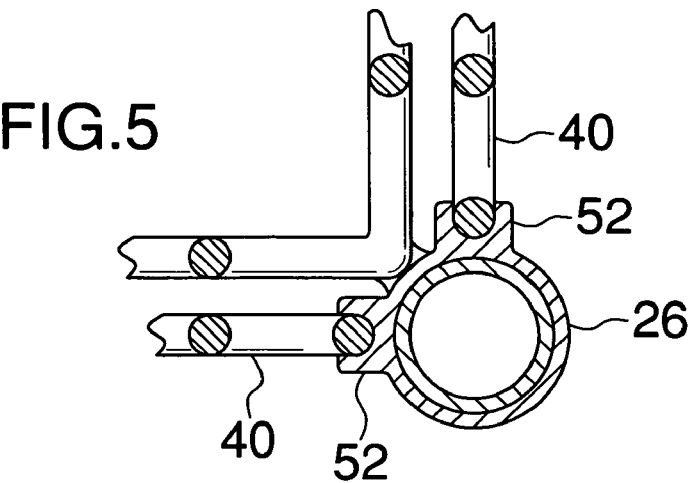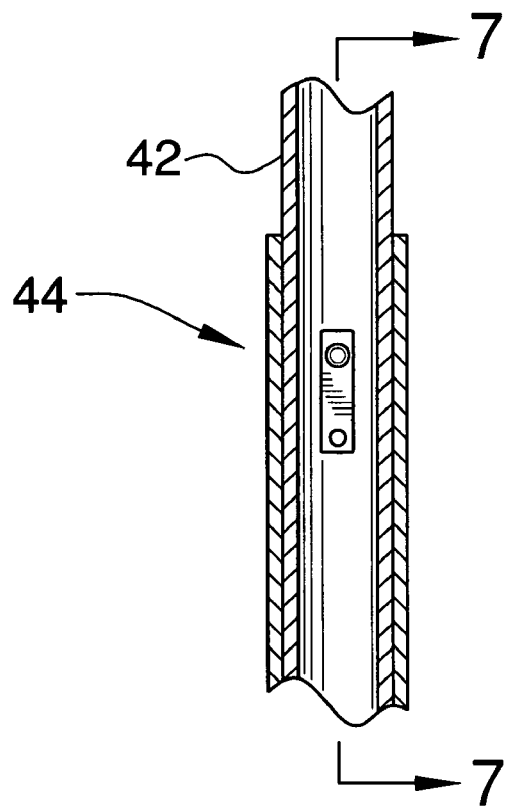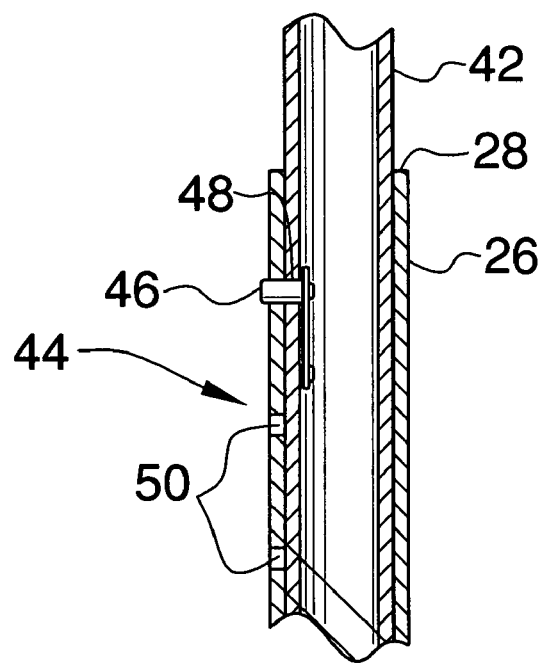

US 7,213,821 B1

EXPANDABLE CART APPARATUS

BACKGROUND OF THE INVENTION

1. Field of the Invention

The present invention relates to cart devices and more particularly pertains to a new cart device for use while shopping and which has the ability to be selectively adjusted for holding an increased volume of goods and other items.

2. Description of the Prior Art

The use of cart devices is known in the prior art. U.S. Pat. No. 2,985,536 describes a device grocery cart assembly that includes a bottom wall which may selectively moved for altering the size of the cart. Another type of cart device is U.S. Pat. No. 3,787,063 having a pivotal section for the allowing the joining of multiple carts in a stored position. U.S. patent No. application 2003/0011152 describes a cart that has a front end that may be selectively extendable outwardly from the cart in order to increase a size of the cart.

While these devices fulfill their respective, particular objectives and requirements, the need remains for a device that includes an upper section of cart which can be selectively extended upwardly from a main body of a cart for selectively increasing a usable volume of the cart.

SUMMARY OF THE INVENTION

The present invention meets the needs presented above by generally comprising a cart having a bottom wall, a front wall, a back wall, a first side wall and a second side wall. The cart has a substantially rectangular shape and includes four vertically orientated corners. A plurality of wheels is rotatably coupled to the bottom wall. Each of the corners includes a post with an open upper end. A loop has a generally rectangular shape and includes a first lateral portion, a second lateral portion, a first end portion and a second end portion. Each of a plurality of secondary walls is attached to and extends downwardly from one of the lateral and end portions. Each of a plurality of rods is attached to the loop and extends downwardly therefrom. Each of the rods is extended into one of the upper ends of the posts. The rods are selectively positionable with respect to the posts so that each of the secondary walls is positioned outside of the cart.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view taken along line 5—5 of FIG. 1 of the present invention.

FIG. 6 is a cross-sectional view taken along line 6—6 of FIG. 1 of the present invention.

FIG. 7 is a cross-sectional view taken along line 7—7 of FIG. 6 of the present invention.

DESCRIPTION OF THE PREFERRED EMBODIMENT

Figure 1:
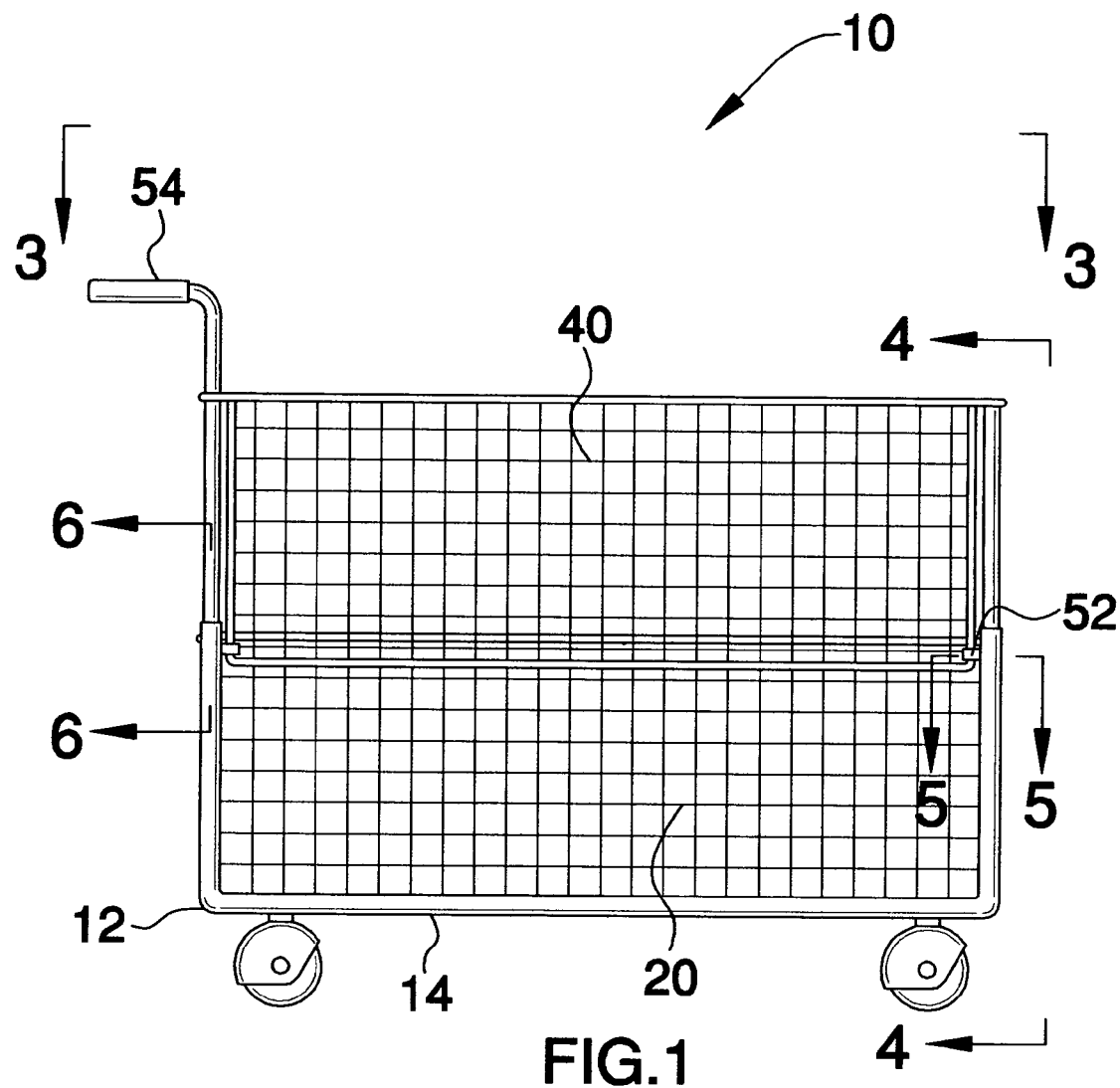
FIG. 1 is a side view of an expandable cart apparatus according to the present invention.
Figure 2:
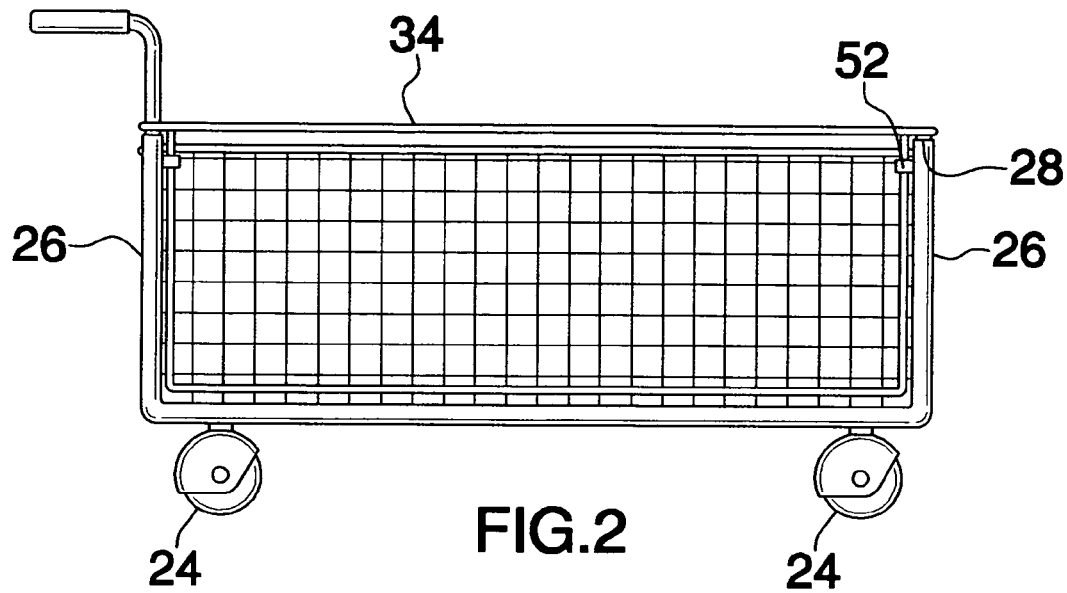
FIG. 2 is a side view of the present invention.
Figure 3:
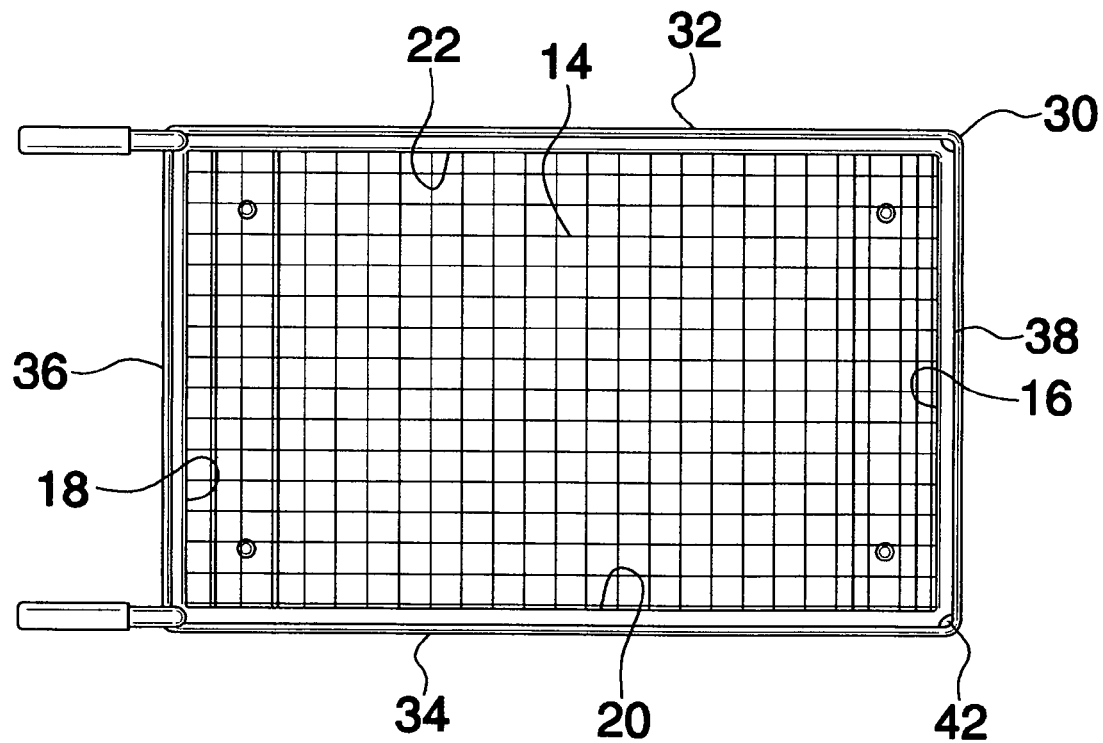
FIG. 3 is a top view of the present invention.
Figure 4:
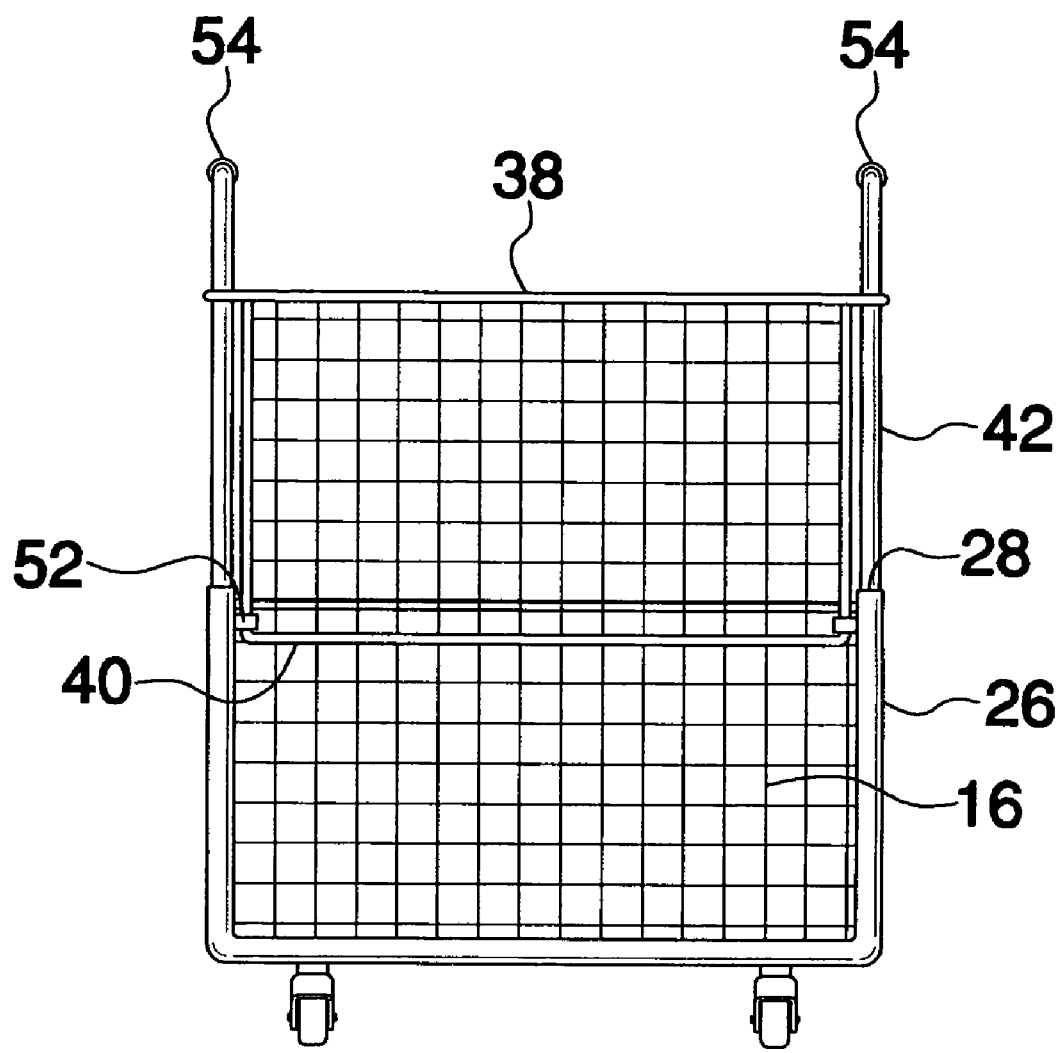
FIG. 4 is a front view of the present invention.

With reference now to the drawings, and in particular to FIGS. 1 through 7 thereof, a new cart device embodying the principles and concepts of the present invention and generally designated by the reference numeral 10 will be described.

As best illustrated in FIGS. 1 through 7, the expandable cart apparatus 10 generally comprises a cart 12 that has a bottom wall 14, a front wall 16, a back wall 18, a first side wall 20 and a second side wall 22 so that the cart 12 has a substantially rectangular shape and includes four vertically orientated corners. A plurality of wheels 24 is rotatably coupled to the bottom wall. Each of the corners includes a post 26 that has an open upper end 28. Each of the front 16, back 18, bottom 14, first side 20 and second 22 side walls comprises a wire screen, which may be made of either metallic or plastic materials.

A loop 30 has a generally rectangular shape and includes a first lateral portion 32, a second lateral portion 34, a first end portion 36 and a second end portion 38. Each of a plurality of secondary walls 40 is attached to and extends downwardly from one of the lateral 32, 34 and end 36, 38 portions. Each of the secondary walls 40 comprises a wire screen, which may again comprise either a metallic or plastic material.

Each of a plurality of rods 42 is attached to the loop 30 and extends downwardly therefrom. The loop 30 has a size such that each of the rods 42 is extendable into one of the upper ends 28 of the posts 26. Each of the rods 42 is selectively positionable with respect to the posts 26 so that each of the secondary walls 40 is positioned outside of the cart 12. A locking assembly 44 is adapted for releasably locking the rods 42 with respect to the posts 26 at a selected height. The locking assembly 44 includes a pin 46 mounted in one of the rods 42 and biased outwardly of an opening 48 in the rod 42. The pin 46 is then selectively extendable through one of a plurality of aligned holes 50 in an associated one of the posts 26.

A plurality of guides 52 is provided. Each of the guides 52 is attached to one of the posts 26 so that each of the posts 26 has a pair of the guides 52 attached thereto. Each of the guides 52 of the pairs of the guides are angled generally perpendicular to each other. The guides 52 are each slidably coupled to one of the secondary walls 40 so that the secondary walls 40 are supported in the guides 52. The guides 52 are positioned generally adjacent to the upper ends 28 of the posts 26.

A pair of handles 54 is attached to the apparatus 10. Each of the handles 54 is attached to an upper end of one of the rods 42 and each of the handles is positioned adjacent to the first end portion 36.

In use, the apparatus 10 is used as a conventional shopping cart. When more volume is required, the secondary walls 40 are lifted upwardly to increase the size of the shopping cart 12. When the apparatus 10 is being unloaded With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cart assembly having an expandable volume, said assembly comprising:
   a cart having a bottom wall, a front wall, a back wall, a first side wall and a second side wall such that said cart has a substantially rectangular shape and includes four vertically orientated corners, a plurality of wheels being rotatably coupled to said bottom wall, each of said corners including a post having an open upper end;
   a loop having a generally rectangular shape and including a first lateral portion, a second lateral portion, a first end portion and a second end portion, each of a plurality of secondary walls being attached to and extending downwardly from one of said lateral and end portions; and
   each of a plurality of rods being attached to said loop and extending downwardly therefrom, each of said rods being extended into one of said upper ends of said posts, each of said rods being selectively positionable with respect to said posts such that each of said secondary walls is positioned outside of said cart; and
   a plurality of guides, each of said guides being attached to one of said posts such that each of said posts has a pair of said guides attached thereto, each of said guides of said pairs of said guides being angled generally perpendicular to each other, each of said guides being slidably coupled to one of said secondary walls.

2. The cart assembly according to claim 1, wherein each of said front, back, bottom, first side and second side walls comprising a wire screen, each of said secondary walls comprising a wire screen.

3. The cart assembly according to claim 1, further including a locking assembly being adapted for releasably locking said rods with respect to said posts at a selected height.

4. The cart assembly according to claim 1, further including a pair of handles, each of said handles being attached to an upper end of one of said rods and each of said handles is positioned adjacent to said first end portion.

5. The cart assembly according to claim 1, further including a pair of handles, each of said handles being attached to an upper end of one of said rods and each of said handles is positioned adjacent to said first end portion.

6. A cart assembly having an expandable volume, said assembly comprising:
   a cart having a bottom wall, a front wall, a back wall, a first side wall and a second side wall such that said cart has a substantially rectangular shape and includes four vertically orientated corners, a plurality of wheels being rotatably coupled to said bottom wall, each of said corners including a post having an open upper end, each of said front, back, bottom, first side and second side walls comprising a wire screen;
   a loop having a generally rectangular shape and including a first lateral portion, a second lateral portion, a first end portion and a second end portion, each of a plurality of secondary walls being attached to and extending downwardly from one of said lateral and end portions, each of said secondary walls comprising a wire screen;
   each of a plurality of rods being attached to said loop and extending downwardly therefrom, each of said rods being extended into one of said upper ends of said posts, each of said rods being selectively positionable with respect to said posts such that each of said secondary walls is positioned outside of said cart;
   a locking assembly being adapted for releasably locking said rods with respect to said posts at a selected height;
   a plurality of guides, each of said guides being attached to one of said posts such that each of said posts has a pair of said guides attached thereto, each of said guides of said pairs of said guides being angled generally perpendicular to each other, each of said guides being slidably coupled to one of said secondary walls; and
   a pair of handles, each of said handles being attached to an upper end of one of said rods and each of said handles is positioned adjacent to said first end portion.

* * * * *